US010569458B2

(12) United States Patent
Galati et al.

(10) Patent No.: US 10,569,458 B2
(45) Date of Patent: Feb. 25, 2020

(54) CONTROLLER ARRANGEMENT FOR INJECTION MOLDING SYSTEM

(71) Applicant: Synventive Molding Solutions, Inc., Peabody, MA (US)

(72) Inventors: Vito Galati, Rowley, MA (US); Lin Yang, Lynnfield, MA (US); Ling Feng, Jiangsu Province (CN); Sergio Ribeiro de Oliveira Antunes, Amesbury, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 80 days.

(21) Appl. No.: 15/992,721

(22) Filed: May 30, 2018

(65) Prior Publication Data

US 2018/0272587 A1 Sep. 27, 2018

Related U.S. Application Data

(63) Continuation of application No. PCT/US2017/034963, filed on May 30, 2017.
(Continued)

(51) Int. Cl.
*G06F 19/00* (2018.01)
*B29C 45/76* (2006.01)
(Continued)

(52) U.S. Cl.
CPC ........ *B29C 45/7613* (2013.01); *B29C 45/231* (2013.01); *B29C 45/281* (2013.01);
(Continued)

(58) Field of Classification Search
CPC .... B29C 2045/2824; B29C 2045/2872; B29C 2945/76006; B29C 2945/7604;
(Continued)

(56) References Cited

U.S. PATENT DOCUMENTS 6,289,259 B1 * 9/2001 Choi .................... B23K 3/0623
425/145
6,514,440 B1 2/2003 Kazmer et al.
(Continued)

OTHER PUBLICATIONS

International Search Report and Written Opinion in corresponding International Application No. PCT/US2017/034963 dated Aug. 17, 2017.
(Continued)

*Primary Examiner* — Kidest Bahta
(74) *Attorney, Agent, or Firm* — Polsinelli PC

(57) ABSTRACT

An injection molding apparatus (10) comprising a signal converter (1500) interconnected to a machine controller (MC) of an injection molding machine (IMM) that generates standardized signals (VPS), the signal converter (1500) receiving and converting the standardized signals (VS) to a command signal (MOPCS, PDCVS) that is compatible with a signal receptor or interface of an electrically powered actuator (940e, 941e, 942e) or a signal receptor, interface or driver of a proportional directional control valve (V, V1, V2) that drives a fluid driven actuator (940p, 941p, 942p) to respectively operate the electrically powered actuator (940e, 941e, 942e) or the proportional directional control valve (V, V1, V2) to move in a direction that operates to either begin an injection cycle and to end an injection cycle.

23 Claims, 10 Drawing Sheets

Related U.S. Application Data

(60) Provisional application No. 62/344,108, filed on Jun. 1, 2016.

(51) Int. Cl.
*B29C 45/28* (2006.01)
*B29C 45/23* (2006.01)

(52) U.S. Cl.
CPC ...... *B29C 45/76* (2013.01); *B29C 2045/2824* (2013.01); *B29C 2045/2872* (2013.01); *B29C 2945/7604* (2013.01); *B29C 2945/76006* (2013.01); *B29C 2945/76083* (2013.01); *B29C 2945/76214* (2013.01); *B29C 2945/76568* (2013.01); *B29C 2945/76859* (2013.01); *B29C 2945/76939* (2013.01)

(58) Field of Classification Search
CPC .......... B29C 2945/76083; B29C 2945/76214; B29C 2945/76568; B29C 2945/76859; B29C 2945/76939; B29C 45/231; B29C 45/281; B29C 45/76; B29C 45/7613
See application file for complete search history.

(56) References Cited

U.S. PATENT DOCUMENTS

| | | | |
|---|---|---|---|
| 2003/0009881 A1* | 1/2003 | Schraudolf | F02D 9/1095 29/888.46 |
| 2004/0081717 A1* | 4/2004 | Marazita | B29C 45/7653 425/150 |
| 2011/0189333 A1* | 8/2011 | Grunitz | B29C 45/82 425/556 |
| 2014/0210119 A1 | 7/2014 | Galati et al. | |
| 2015/0239162 A1 | 8/2015 | Yang et al. | |
| 2018/0264698 A1 | 9/2018 | Bazzo et al. | |

OTHER PUBLICATIONS

Written Opinion in corresponding International Application No. PCT/US2017/034963 dated Apr. 25, 2018.
International Preliminary Report on Patentability in corresponding PCT application PCT/US2017/034963 dated Jun. 15, 2018.
International Search Report and Written Opinion in PCT/US2017/034963 dated Aug. 17, 2017.
Written opinion of the International Preliminary Examining Authority in PCT/US2017/034963 dated Apr. 25, 2018.

\* cited by examiner

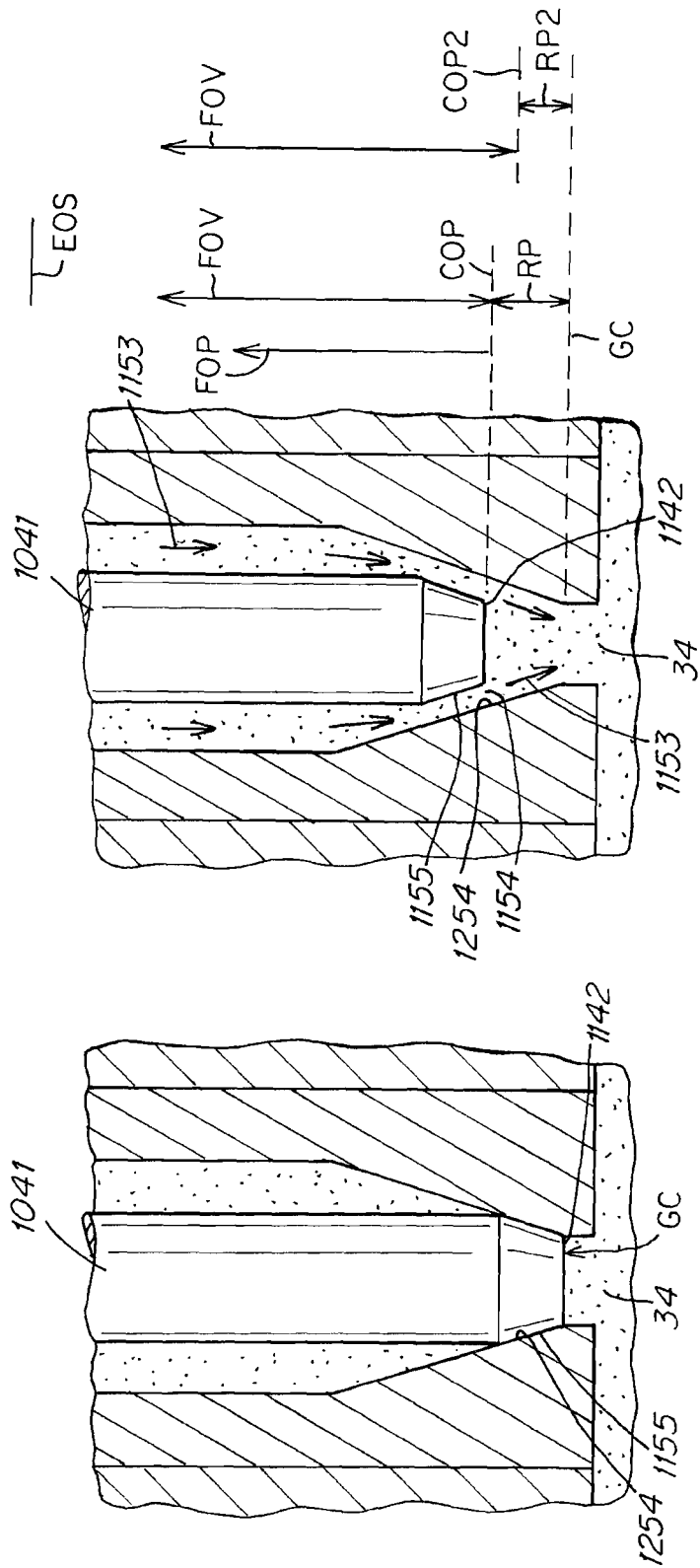

CONTROLLER ARRANGEMENT FOR INJECTION MOLDING SYSTEM

RELATED APPLICATIONS

This application is a continuation of and claims the benefit of priority to PCT/US2017/034963 filed May 30, 2017 which claims the benefit of priority to U.S. Application Ser. No. 62/344,108 filed Jun. 1, 2016, the disclosures of which are incorporated by reference as if fully set forth in their entirety herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300, U.S. Pat. No. 6,419,870, U.S. Pat. No. 6,464,909, U.S. Pat. No. 6,599,116, U.S. Pat. No. 7,234,929, U.S. Pat. No. 7,419,625, U.S. Pat. No. 7,569,169, U.S. patent application Ser. No. 10/214,118, filed Aug. 8, 2002, U.S. Pat. No. 7,029,268, U.S. Pat. No. 7,270,537, U.S. Pat. No. 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, and U.S. application Ser. No. 10/101,278 filed Mar. 19, 2002 and PCT application no. PCT/US2011/029721 filed Mar. 24, 2011, PCT publication no. WO2012074879 (A1) and WO2012087491 (A1) and PCT/US2013/75064 and PCT/US2014/19210 and PCT/US2014/31000 and U.S. Publication No. 20150239161 and U.S. Pat. No. 9,498,909.

BACKGROUND OF THE INVENTION

Injection molding systems that use an injection molding machine that includes a controller that controls the opening and closing positions of a hydraulic or pneumatic valve pin have been used. The signaling of when the fluid driven valves are supposed to close or open is controlled by a signal generated by the injection molding machine (IMM) that is sent to the solenoid of a fluid flow directional control valve (DCV) to instruct the DCV to move to a valve pin directional closed or valve pin directional open position. The signal that is sent from the injection molding machine (or from an intermediate controller that is initially signaled by a screw position sensor SPSR that senses position of the barrel screw BS of the injection molding machine) to the solenoid component of the DCVs is typically a simple 0 volt signal for closed and a 24 volt signal for open (or sometimes a 0 volt signal for closed and 120 volt signal for open). Such prior systems are standardized such that all DCVs and IMMs are designed to be universally compatible for simplicity of customer use and installation purposes.

SUMMARY OF THE INVENTION

In accordance with the invention there is provided a modular control unit (1500) comprising:
 a housing (1502) containing an electronic controller (16), multiple input interfaces (1504, 1506), and at least one driver (MD, HVD, PVD),
 a first input interface (1506) configured to receive a valve control signal (VS) specifying valve open or valve closed or start of injection cycle and end of injection cycle, and outputting a data signal (1506s) indicative thereof to the controller (16);
 a second input interface (1504) configured to receive a pin position signal (PS) specifying a position of a valve pin along a continuous path of travel and outputting a data signal (1504s) indicative thereof to the controller (16);
 the controller (16) including a processor and computer readable media with instructions for pre-configured actuated control of valve pin position, wherein the instructions, when executed by the processor, cause the processor to generate, based on the data signals (VS, PS) an output control signal (IS) for controlling valve pin position via at least one of: a) a hydraulic proportional directional control valve (V, V1, V2), b) a pneumatic proportional directional control valve (P1, P2, P3), and c) an electric motor (940e, 941e, 942e),
 the at least one driver (MD, HVD, PVD) configured to receive the output control signal from the controller and generate a control unit output signal (MOPCS, PDCVS, PVS) that drives at least one of a) the hydraulic proportional directional control valve (V, V1, V2), b) the pneumatic proportional directional control valve (P1, P2, P3), and c) the electric motor (940e, 941e, 942e) for control movement of the valve pin.

The pin position signal (PS) is typically received from a sensor (950, 951, 952) that senses a linear or rotational position of an actuator (940e, 940f) or a valve pin (1040, 1041).

The housing (1502) typically further contains a power management circuit (1508) that receives an input AC or DC power input, and wherein the power management circuit outputs a power signal (1508s) to the driver (MD, HVD, PVD).

The modular control unit is preferably adapted for use in an injection molding apparatus wherein an injection molding machine (IMM) or a fluid pressure unit (HPU) generates the input valve control signal (VS.) specifying valve open and valve closed or start of injection cycle and end of injection cycle, and a position sensor (950, 951, 952) generates the input pin position signal (PS).

The modular control unit can further comprise a user interface (1510) for receiving input from a human operator, the input being transmitted to the controller (16) and the input being stored on the computer readable media.

The input is typically executed by the processor, along with the instructions, for generating the output control signal.

The output control signal preferably specifies instructions for one or more of: calibrating a valve pin position sensor, specifying a valve pin open or closed position, specifying a valve pin position along the continuous path of travel, and specifying a valve pin velocity.

The instructions for pre-configured actuated control of valve pin position can comprise sequential valve gating control parameters.

The instructions for pre-configured actuated control of valve pin position can comprise simultaneous valve gating control parameters.

In another aspect of the invention there is provided a modular injection molding system control unit (1500) interconnected to an injection molding machine (IMM) controller (MC) comprising:
 a housing (1502) containing an electronic controller (16), one or more input interfaces (1504, 1506), and at least one driver (MD, HVD, PVD),
 at least one input interface (1506) configured to receive a valve control signal (VS) specifying valve open and valve closed or start of injection cycle and end of injection cycle, and outputting a data signal (1506s) indicative thereof to the controller (16);

the controller (16) including a processor and computer readable media with instructions for pre-configured actuated control of valve pin position, wherein the instructions, when executed by the processor, cause the processor to generate, based on the data signal (1506s) an output control signal (IS) for controlling valve open and valve closed position or start of injection cycle and end of injection cycle via at least one of: a) a hydraulic proportional directional control valve (V, V1, V2), b) a pneumatic proportional directional control valve (P1, P2, P3), and c) an electric motor (940e, 941e, 942e), the at least one driver (MD, HVD, PVD) configured to receive the output control signal (IS) from the controller (16) and generate a control unit output signal (MOPCS, PDCVS) that drives at least one of a) the hydraulic proportional directional control valve (V, V1, V2), b) the pneumatic proportional directional control valve (P1, P2, P3), and c) the electric motor (940e, 941e, 942e) for control movement of the valve pin.

The at least one input interface (1506) receives the valve control signal (VS) either directly from the injection molding machine (IMM) controller (MC) or indirectly from an intermediate control unit (HPU) that receives a corresponding instruction signal (SPS) from the injection molding machine (IMM) that is at least indicative of valve open and valve closed or start of injection cycle and end of injection cycle.

In another aspect of the invention there is provided an injection molding apparatus (10) comprising an injection molding machine (IMM) having a drivably rotatable barrel screw (BS) that generates an injection fluid (18), a heated manifold (40) that receives the injection fluid (18) from the injection molding machine (IMM) and distributes the injection fluid (18) to one or more gates (32, 34, 36), a mold (42) having a cavity (30) communicating with the gates to receive the injection fluid (18), the injection molding machine (IMM) including a machine controller (MC) or control unit (HPU) that generates one or more standardized signals (VS), wherein the standardized signals (VS) are compatible for receipt and use by a signal receptor, interface or driver of a standard directional control valve (12) to instruct the fluid directional control valve (12) to move to a position that routes a source of drive fluid to flow in a direction that drives an interconnected fluid drivable actuator (940f, 941f, 942f) to move in a direction that operates to begin an injection cycle and to end an injection cycle, a signal converter (1500) interconnected to the machine controller (MC) or control unit (HPU), the signal converter (1500) being adapted to convert the standardized signals (VPS) to a command signal (MOPCS, PDCVS) that is compatible with a signal receptor or interface of an electrically powered actuator (940e, 941e, 942e) or a signal receptor or interface of a proportional directional control valve (V, V1, V2) that is interconnected to a fluid driven actuator (940p, 941p, 942p), wherein the command signals (MOPCS, PDCVS) are converted by the signal converter (1500) into a form, frequency, power or format that is usable by the signal receptor or interface of the electrically powered actuator (940e, 941e, 942e) or the proportional directional control valve (V, V1, V2) to respectively cause the electrically powered actuator (940e, 941e, 942e) or the proportional directional control valve (V, V1, V2) to be driven in a direction that operates to either begin an injection cycle or to end an injection cycle.

The direction that operates to begin an injection cycle is preferably a direction that operates to cause the actuator (940e, 941e, 942e, 940p, 941p, 942p) or its associated valve pin (1040, 1041, 1042) to open a gate (32, 34, 36) and the direction that operates to end an injection cycle is a direction that causes the actuator (940e, 941e, 942e, 940p, 941p, 942p) or its associated valve pin (1040, 1041, 1042) to close the gate (32, 34, 36).

The direction that operates to begin an injection cycle is an upstream direction in which the actuator (940e, 941e, 942e, 940p, 941p, 942p) or its associated valve pin (1040, 1041, 1042) moves upstream from a gate closed position to an open gate position (32, 34, 36) and the direction that operates to end an injection cycle is a downstream direction in which the actuator (940e, 941e, 942e, 940p, 941p, 942p) or its associated valve pin (1040, 1041, 1042) moves downstream from an open gate position to a closed gate position (32, 34, 36).

The standardized signals (VPS) typically comprise a voltage signal of predetermined voltage or magnitude indicative of a predetermined rotational position of the barrel screw (BS) of the injection molding machine (IMM) that generates pressurized injection fluid (18) within the apparatus.

The apparatus (10) can further comprise one or more sensors (950, 951, 952, SN, SC, SPSR, BPSR) that detect and generate one or more sensor signals indicative of one or more of rotational or linear position of an actuator (940e, 941e, 942e, 940p, 941p, 942p) or its associated valve pin (1040, 1041, 1042), pressure or temperature of the injection fluid 18 within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (940e, 941e, 942e, 940p, 941p, 942p) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940e, 941e, 942e, 940p, 941p, 942p) or its associated valve pin (1040, 1041, 1042) such that the valve pin is withdrawn from a closed gate position upstream at a reduced velocity over a selected path of upstream travel, or that, instructs the actuator (940e, 941e, 942e, 940p, 941p, 942p) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940e, 941e, 942e, 940p, 941p, 942p) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

In another aspect of the invention there is provided a method of beginning and ending an injection cycle comprising operating an apparatus (10) in accordance with any of the foregoing described apparatuses to perform an injection cycle.

In another aspect of the invention there is provided a signal converter (1500) for converting signals generated by an injection molding apparatus (10) that is comprised of an injection molding machine (IMM) having a drivably rotatable barrel screw (BS) that generates an injection fluid (18), a heated manifold (40) that receives an injection fluid (18) from the injection molding machine (IMM) and distributes the injection fluid (18) to one or more gates (32, 34, 36), a mold (42) having a cavity (30) communicating with the gates to receive the injection fluid (18), wherein the injection molding machine (IMM) includes a machine controller (MC) or a control unit (HPU) that generates one or more standardized signals (VS), wherein the standardized signals (VS) are compatible for use by a signal receptor, interface or driver of a standard fluid directional control valve (12) to instruct the fluid directional control valve (12) to move to a position that routes a source of drive fluid to flow in a direction that drives an interconnected fluid drivable actuator (940f, 941f, 942f) to move in a direction that operates to begin an injection cycle and to move in a direction that operates to end an injection cycle, wherein the signal converter (1500) is interconnected to the machine controller (MC) or control unit (HPU), the signal converter (1500) receiving and converting the standardized signals (VPS) to a command signal (MOPCS, PDCVS) that is compatible with a signal receptor or interface of an electrically powered actuator (940e, 941e, 942e) or a signal receptor or interface of a proportional directional control valve (V, V1, V2) that drives a fluid driven actuator (940p, 941p, 942p), wherein the signal converter (1500) includes a processor that converts the command signals (MOPCS, PDCVS) into a form, frequency, power or format that is usable by the signal receptor or interface of the electrically powered actuator (940e, 941e, 942e) or by the signal receptor or interface of the proportional directional control valve (V, V1, V2) to respectively cause the electrically powered actuator (940e, 941e, 942e) or the proportional directional control valve (V, V1, V2) to be driven in a direction that operates to either begin an injection cycle or to end an injection cycle.

The direction that operates to begin an injection cycle is preferably a direction that operates to moves the actuator (940e, 941e, 942e, 940p, 941p, 942p) or its associated valve pin (1040, 1041, 1042) to open a gate (32, 34, 36) and the direction that operates to end an injection cycle is a direction that operates to move the actuator (940e, 941e, 942e, 940p, 941p, 942p) or its associated valve pin (1040, 1041, 1042) to close the gate (32, 34, 36).

The direction that operates to begin an injection cycle is preferably an upstream direction in which the actuator (940e, 941e, 942e, 940p, 941p, 942p) or its associated valve pin (1040, 1041, 1042) moves upstream from a gate closed position to an open gate position (32, 34, 36) and the direction that operates to end an injection cycle is a downstream direction in which the actuator (940e, 941e, 942e, 940p, 941p, 942p) or its associated valve pin (1040, 1041, 1042) moves downstream from an open gate position to a closed gate position (32, 34, 36).

The standardized signals (VS) typically comprise a voltage signal of predetermined voltage or magnitude indicative of a predetermined rotational position of the barrel screw (BS) of the injection molding machine (IMM) that generates pressurized injection fluid (18) within the apparatus.

The signal converter (1500) typically further comprises one or more sensors (950, 951, 952, SN, SC, SPSR, BPSR) that detect and generate one or more sensor signals indicative of one or more of rotational or linear position of an actuator (940e, 941e, 942e, 940p, 941p, 942p) or its associated valve pin (1040, 1041, 1042), pressure or temperature of the injection fluid 18 within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (940e, 941e, 942e, 940p, 941p, 942p) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940e, 941e, 942e, 940p, 941p, 942p) or its associated valve pin (1040, 1041, 1042) such that the valve pin is withdrawn from a closed gate position upstream at a reduced velocity over a selected path of upstream travel, or that, instructs the actuator (940e, 941e, 942e, 940p, 941p, 942p) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940e, 941e, 942e, 940p, 941p, 942p) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

In another aspect of the invention there is provided a method of beginning and ending an injection cycle comprising operating a signal converter (1500) in accordance with any of the foregoing claims 7-11 to perform an injection cycle.

In another aspect of the invention there is provided an injection molding system comprised of an injection molding machine, a manifold, a mold and a valve having an associated valve pin drivable by an actuator between a gate closed position and a gate open position, the injection molding machine injecting a selected injection fluid to the manifold which distributes the injection fluid to the valve, the injection fluid flowing through the gates into a cavity in the mold when the valve pin is in the gate open position, wherein the system includes a first controller that includes a first set of instructions that generate a first set of one or more signals that are adapted to instruct a drive mechanism for a first selected actuator that is adapted to be interconnected to the valve pin to drive the valve pin between gate closed and gate open positions, the system comprising a second controller interconnected to the first controller, the second controller receiving the first set of signals from the first controller and including a second set of instructions that convert the received first set of signals to a second set of signals that are adapted to instruct a drive mechanism for a second selected actuator that is interconnected to the valve pin to drive the interconnected valve pin between gate closed and gate open positions.

The first selected actuator is typically a hydraulic or pneumatic actuator and the second selected actuator is preferably an electrically driven actuator comprised of an electrically driven motor interconnected to the valve pin. Typical electric actuator configurations and embodiments are shown and described in International Application Publication No. WO 2015/006261 and U.S. Pat. No. 6,294,122, the disclosures of which are appended hereto as appendices A and B respectively and incorporated herein by reference as if fully set forth herein.

The second controller can include instructions that control positioning of the valve pin at one or more selected positions between the gate closed position and the gate open position for a selected period of time subsequent to movement of the valve pin from the gate closed position toward the gate open position.

BRIEF DESCRIPTION OF THE DRAWINGS

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the pneumatic pressure is normally at full pressure and pin velocity is at its maximum.

FIG. 5A shows a protocol for driving a pin beginning from a maximum upstream position at a full velocity downstream to a partially gate open position where the tip end of the pin is disposed at about 4 mm from the gate resulting in reduced injection fluid flow and finally driven downstream from the 4 mm position at a reduced velocity to the gate closed position. In the FIG. 5A embodiment the tip end of the pin is held or maintained in the partially gate open 4 mm position for a selected period of time from about 0.15 and about 0.26 seconds. FIG. 5B shows a protocol for driving a pin from gate closed downstream upstream at a reduced velocity to a partially gate open position where the tip end of the pin is disposed at about 2.5 mm from the gate resulting in reduced injection fluid flow through the gate and finally driven upstream to a maximum upstream position at either a reduced velocity (shown in solid line) or at full velocity (shown in dashed line).

DETAILED DESCRIPTION OF THE INVENTION

Figure 1:
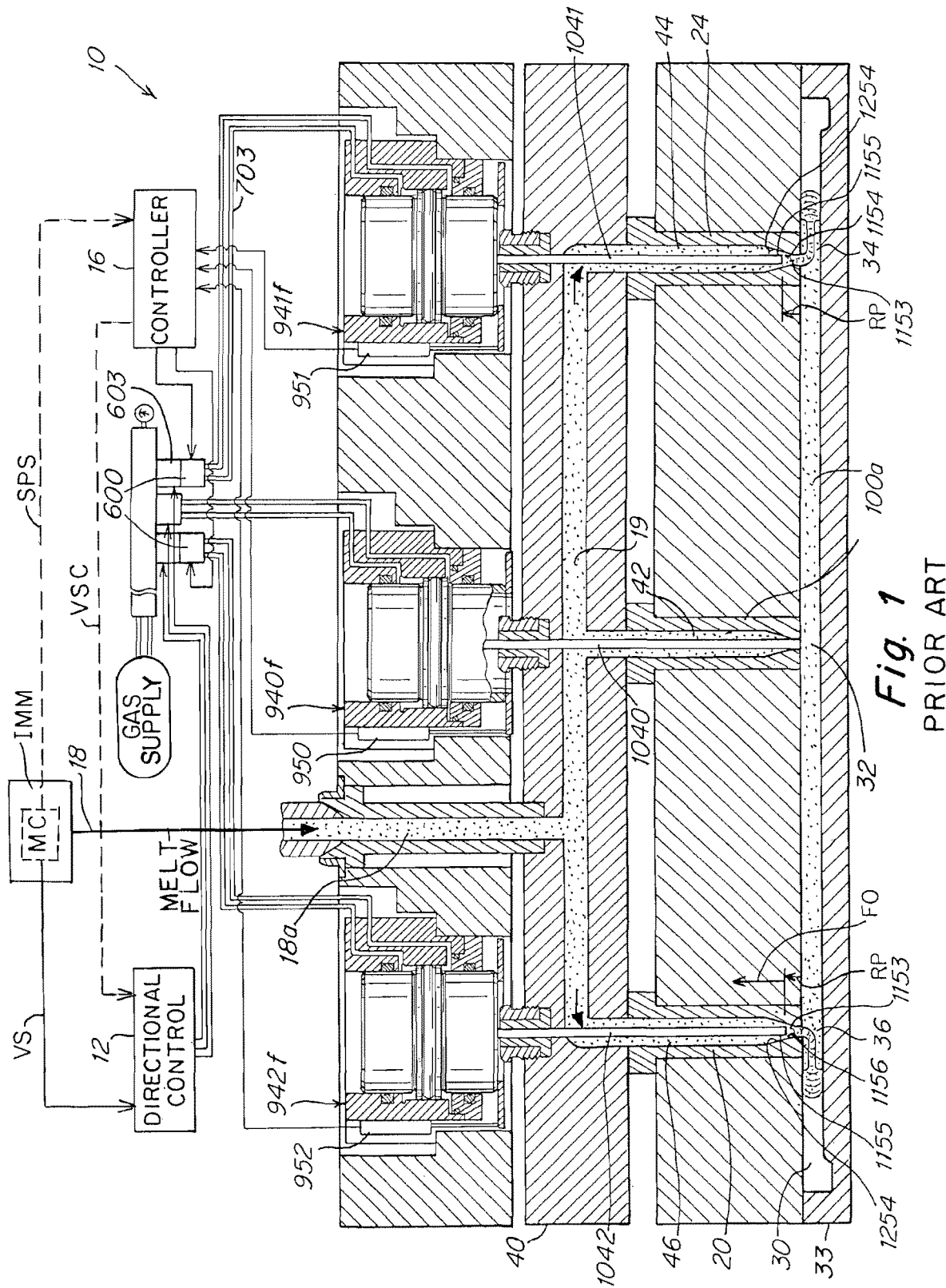
FIG. 1 is a side schematic view of a prior art injection molding system in which an injection molding machine (IMM) includes a stock or standard IMM controller or signal generator that sends a standard IMM controller signal to the solenoid of a directional flow control valve that directs the position of the valve to move between a valve gate closed and valve gate open position.

FIG. 1 shows a conventional pneumatically (or hydraulically) driven system 10 with a central nozzle 22 feeding molten material 18 from an injection molding machine IMM through a main inlet 18a to a distribution channel 19 of a manifold 40. The IMM typically comprises a barrel (not shown) and a controllably rotatably drivable or driven screw BS that initiates and ends an injection cycle at selected points in time when the screw BS is rotatably driven to generate flow of injection fluid 18. The beginning of an injection cycle is typically defined at a selected point in time when the screw BS is initially rotated from a standstill position or at a time that occurs shortly after the time when the screw BS is initially begun rotating. The end of the cycle is typically defined by a time at which the screw BS is stopped from rotating following and after the selected time that defines the beginning of the cycle when the screw BS is drivably rotated. The distribution channel 19 commonly feeds three separate nozzles 20, 22, 24 which all commonly feed into a common cavity 30 of a mold 33. One of the nozzles 22 is controlled by fluid driven actuator 940f and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As shown in FIG. 1 the injection cycle is a cascade process where injection is effected in a sequence from the center nozzle 22 first and at a later predetermined time from the lateral nozzles 20, 24. The injection cycle is started by first opening the pin 1040 of the center nozzle 22 and allowing the fluid material 100 (typically polymer or plastic material) to flow up to a position the cavity just before 100b the distally disposed entrance into the cavity 34, 36 of the gates of the lateral nozzles 24. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042. As described below, the rate of upstream withdrawal or travel velocity of lateral pins 1041, 1042 is controlled as described below. The center gate 32 and associated actuator 940f and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

The rate or velocity of upstream and downstream travel of pins 1041, 1042 starting from either the gate closed position or the fully open upstream position is controlled via an actuator controller 16 which controls the rate and direction of flow of pneumatic or hydraulic fluid from the drive system 14 to the actuators 940f, 941f, 942f. A predetermined profile of metered drive fluid pressure or a profile of sensed injection fluid pressure or temperature sensed by a sensor SN that senses the fluid within the nozzle channel 42, 44, 46 or a profile of sensed pin or actuator position or a profile of injection fluid pressure or temperature sensed within the mold cavity by a cavity sensor SC or a profile of metered drive fluid pressure versus elapsed time can be input into the actuator controller 16 as the basis for controlling upstream and downstream travel of the valve pin(s) 1041 et al. at one or more selected velocities over the course of travel of the valve pin through the stroke length either upstream or downstream. For example the actuator controller 16 can include instructions that instruct the drive members of the actuators to move the actuators at a reduced velocity relative to one or more selected higher velocities of withdrawal. The higher velocity is typically selected to be the highest velocity at which the system is capable of driving the actuators. Typically, the instructions instruct the actuators to move the valve pins upstream from the gate closed position at a reduced velocity over the course of travel where the tip end of the valve pin restricts the flow of injection fluid 18 to less than the flow would otherwise be if the valve pin were disposed fully upstream, the restriction occurring as a result of the tip end of the valve pin restricting the size of the flow path or opening at or near the gate 32, 34, 36 to a size that is less than the size of the opening or flow path would otherwise be if the valve pin were disposed fully upstream of the gate 32, 34, 36.

The actuator controller 16 receives a signal in real time from a pressure sensor 603 (or 605, 607) disposed in the drive fluid line communicating with the exit of the metering valve 600, the signal being indicative of the reduced drive fluid pressure in line 703 (or 705, 707). The actuator controller 16 instructs the valve 600 to move to a degree of openness that causes the fluid pressure in the line to match the pressure of the predetermined profile at any given point in time or pin position along the pressure versus time profile or pressure versus position profile. The pressure in the exit line of the metering valve 600 is proportional and corresponds to the velocity of withdrawal movement of the actuator 941f (940f, 942f) and associated valve pin 1041 (1040, 1042).

As used in this application with regard to various monitoring and control systems, the terms "controller," "component," "computer" and the like are intended to refer to a computer-related entity, either hardware, a combination of hardware and software, software, or software in execution. For example, a component or controller may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Claimed methods of the present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" or the like means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media or the like includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described herein may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A "controller," as used herein also refers to electrical and electronic control apparatus that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

As shown in the conventional system of FIG. 1, the injection molding machine IMM includes its own internal manufacturer supplied machine controller that generates standardized beginning of cycle gate closed and end of cycle gate open and gate closed machine voltage signals VS typically 0 volts for gate open and 24 volts for gate open (or 0 volts and 120 volts respectively). The standardized machine voltage signals VS are typically sent either directly to the solenoids of a master directional control valve 12 (that controls the direction of flow of actuator drive fluid into or out of the drive chambers of all of the plurality of fluid driven actuators (940$f$, 941$f$, 942$f$) to cause the directional control valve 12 (DCV) to move to a gate closed or gate open actuator drive fluid flow position. Or, the same standardized voltage signals VSC can be sent to the directional control valve 12 via the actuator controller 16 which generates the same standardized voltage signals VSC as the VS signals in response to receipt from a screw position sensor SPSR of a machine screw position signal SPS sent by the injection molding machine IMM to the actuator controller 16, the actuator controller 16 thus generating the same beginning of cycle and end of cycle control voltage signals VSC as the machine IMM can otherwise generate and send VS directly to the directional control valve 12. Thus, where conventional standardized directional control valves 12 are used, the sending of start of cycle and end of cycle signals can be simplified via electrical or electronic signal connections directly to the internal signal generator or controller contained within the injection molding machine.

Electrically powered actuators or electric motors and proportional directional control valves cannot directly receive and utilize a standardized 0 volt (gate closed), 24 volt (gate open) or 0 volt (gate closed) 120 volt (gate open) signals generated by the start and stop cycle controller or signal generator that is typically included in a conventional injection molding machine.

Figure 2:
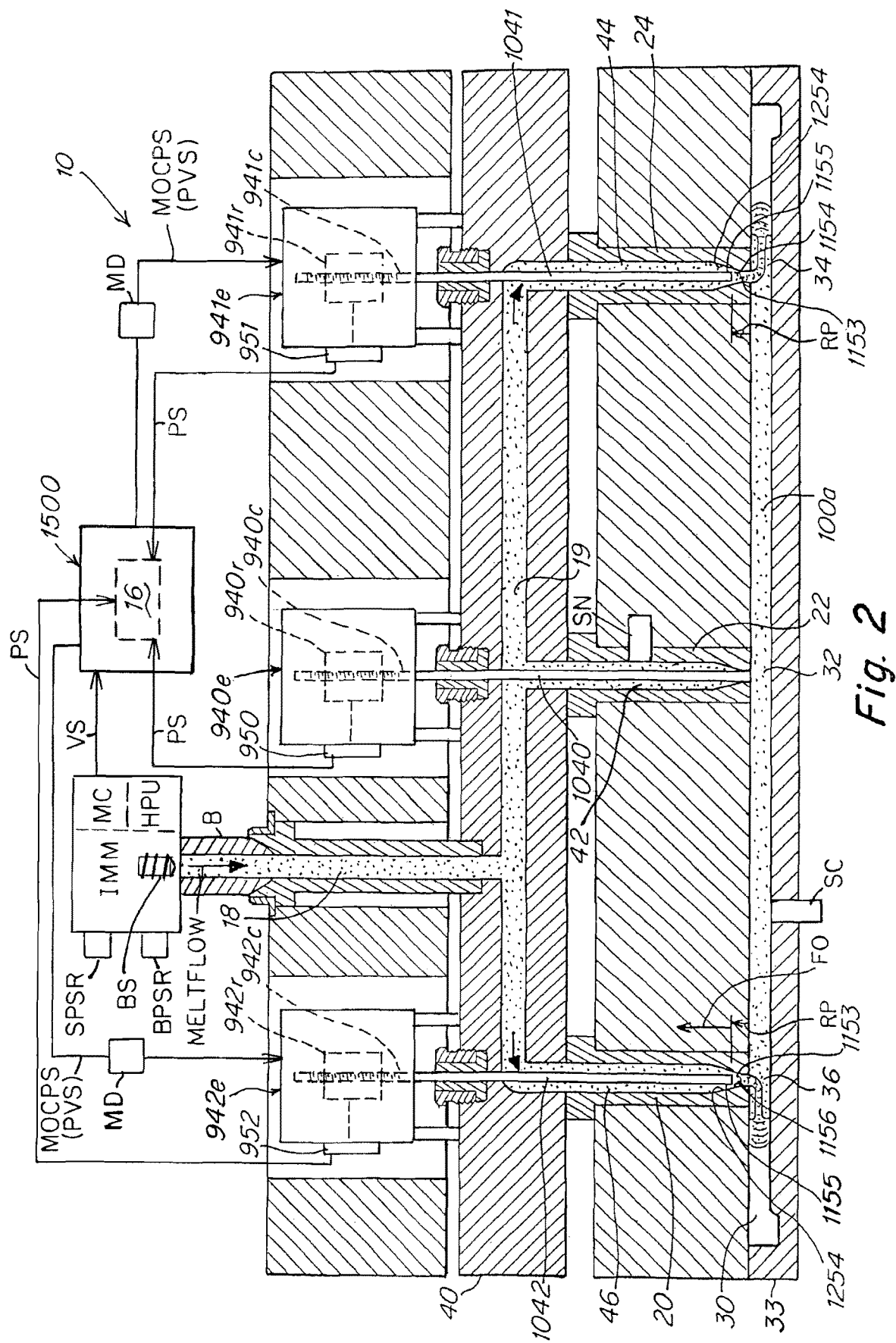
FIG. 2 is a side schematic view of one embodiment of an injection molding system according to the invention where the valve gates include an electrically powered or electric motor containing actuator, the system including a machine signal converter that receives a standard signal generated by an injection machine controller converts the signal to a control signal compatible with the signal receptor of the electrically powered actuators used in the system, the converter routing the converted signal to the actuator processor.
Figure 2A:
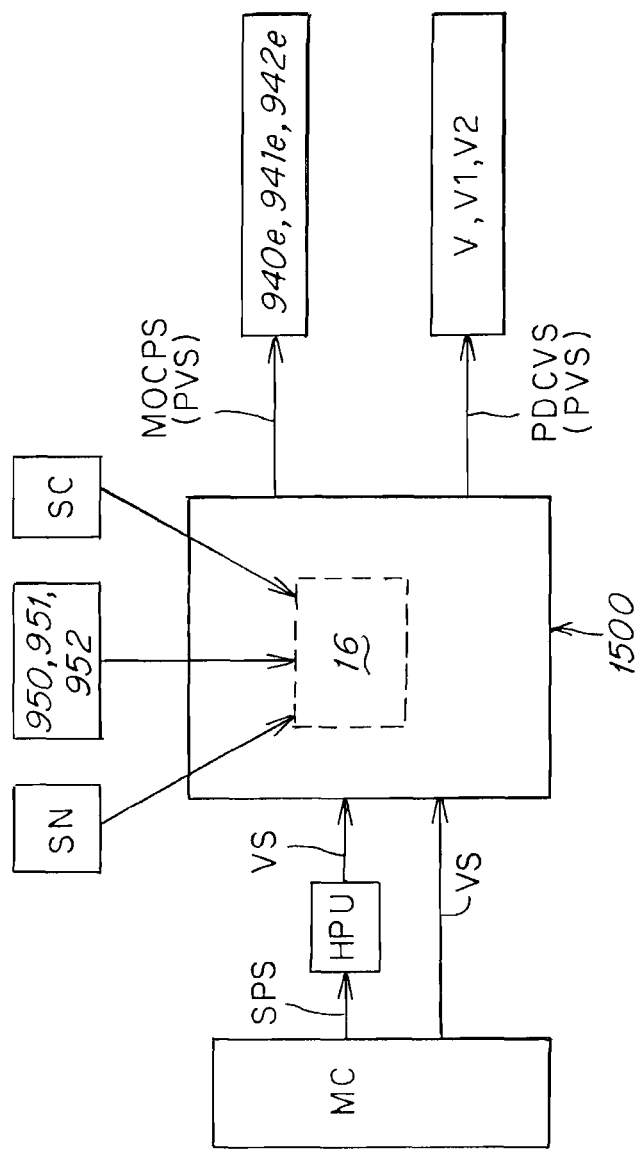
FIG. 2A is a generic schematic diagram of an arrangement of signal communications between an injection molding machine controller, sensors, a signal converter and electric actuators or the interface of a proportional directional control valve.

As shown in a generic schematic form in FIG. 2A, a system 10 according to the invention incorporates a signal converter 1500 that can receives standardized injection machine generated start of cycle and end of cycle signals VS (such as 0 volts, 24 volts or 120 volts) and converts the received standardized signal VS to an output power signal MOCPS or PDCVS that is compatible for receipt and use by an electric motor or a proportional direction control valve power signal. The two different actuator based systems, namely electric motor and proportional directional control valve, are shown together in the generic FIG. 2A for illustration purposes only. More typically, a practical implementation of a system as shown in FIG. 2A would be such that the converter 1500 would contain a single microcontroller and an interconnected driver that is configured to work with one or the other of an electric actuator based system or a proportional directional control valve system.

FIG. 2 shows an electric actuator based system in simplified schematic form. As shown in FIG. 2, electric actuators 940$e$, 941$e$, 942$e$ each have a rotating rotor 940$r$, 941$r$, 942$r$ that is driven by electrical power (typically delivered via the converter 1500) one or more of the precise polarity, amplitude, voltage and strength of which is controlled for input to the motors by actuator controller 16 and the program contained in the actuator controller 16. The rotating rotors 940$r$, 941$r$, 942$r$ are interconnected to a translationally movable shaft or other suitable connecting devices 940$c$, 941$c$, 942$c$ that interconnect the valve pins 1040, 1041, 1042 to the driven rotors 940$r$, 941$r$, 942$r$. A typical interconnection between a shaft driven by a rotor and the head of a valve pin is shown in U.S. Reexamination Certificate 6,294,122 C1 and U.S. Pat. No. 9,492,960 the disclosures of which are incorporated herein by reference in their entirety as if fully set forth herein.

FIG. 2 illustrates an example of a system 10 according to the invention having a plurality of electric power driven actuators 940$e$, 941$e$, 942$e$, with a central nozzle 22 feeding molten material 18 from an injection molding machine IMM through a main inlet 18$a$ from a barrel of the injection molding machine IMM to a distribution channel 19 of a manifold 40. As in the conventional system of FIG. 1 in the FIGS. 2, 3 systems the IMM typically comprises a barrel (not shown) and a controllably rotatably drivable or driven screw BS disposed within the barrel to generate a pressurized supply of injection fluid 18 the pressure of which can be detected by a barrel pressure sensor BPSR which can send a signal indicative of barrel pressure to a controller 16 for use in controlling positioning and velocity of the valve pin 1040, 1041, 1042. The screw BS of the IMM initiates and ends an injection cycle at selected points in time when rotation of the screw BS is started and stopped. The beginning of an injection cycle is typically defined at a first selected point in time when the screw BS is initially rotated from a standstill position or at a time that occurs shortly after the time when the screw is initially rotated. The end of the cycle is typically defined by a selected second time following and after the first selected time at which second time the screw is stopped from rotating and injection fluid 18 is stopped from being injected into the heated manifold 40.

The distribution channel 19 commonly feeds three separate nozzles 20, 22, 24 which all commonly feed into a common cavity 30 of a mold 33. One of the nozzles 22 is controlled by an electric motor actuator 940e and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 3:
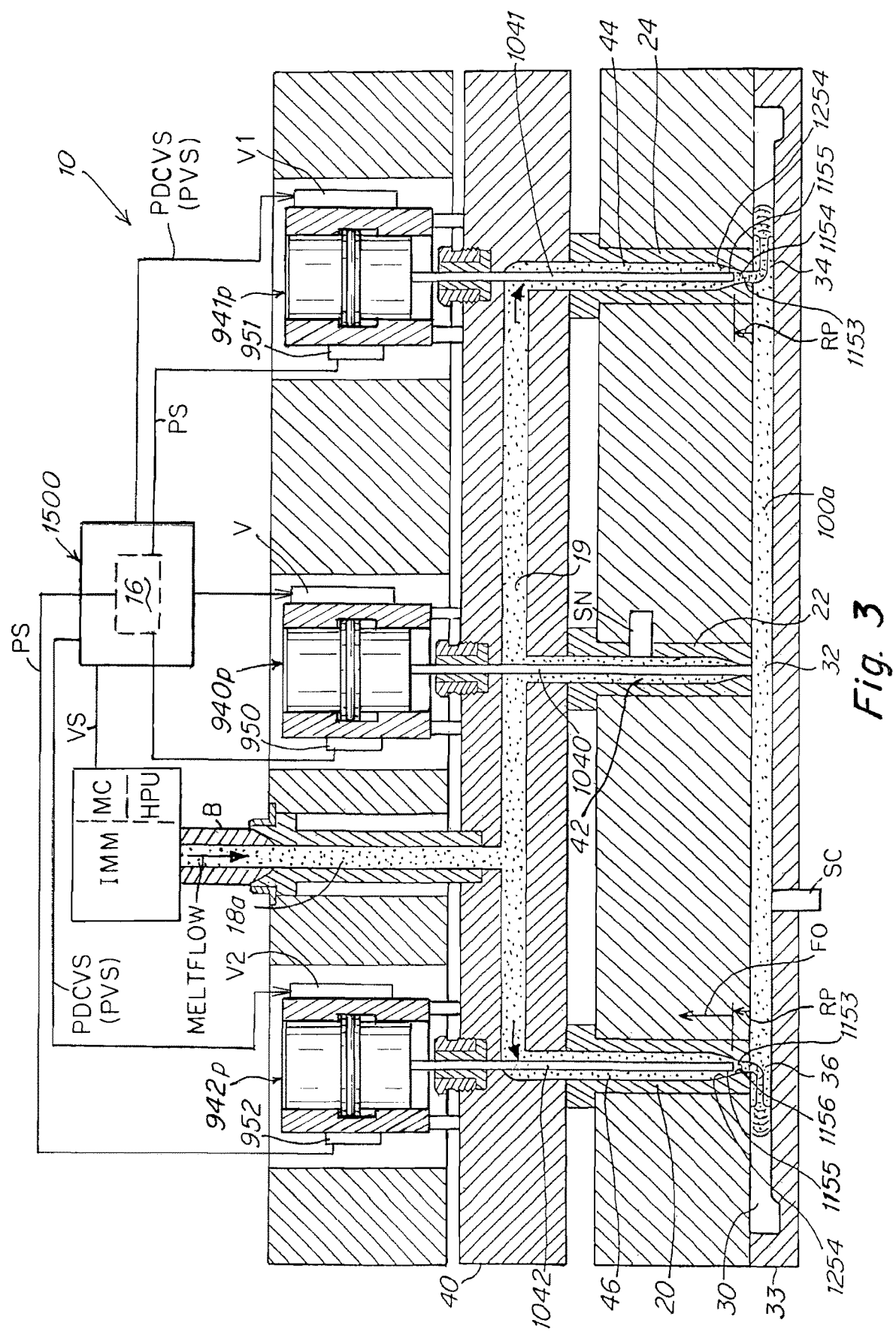
FIG. 3 is a side schematic view of another embodiment of an injection molding system according to the invention where the valve gates include a proportional directional control valve, the system including a machine signal converter that receives a standard signal generated by an injection machine controller, converts the signal to a control signal compatible with the signal receptor of the proportional directional control valves used in the system, the converter sending the converted signal to the proportional directional control valves.

As with the system of FIG. 1, an injection cycle using the systems of FIGS. 2, 3 is typically are used to carry out a cascade or sequential valve gate process where injection is effected in a sequence from the center nozzle 22 first and at later predetermined times from the lateral nozzles 20, 24. The cascade process is discussed in detail as an example only, the invention encompassing configurations and protocols where a single valve pin and valve gate inject into a single cavity.

Also as with the FIG. 1 system, the FIGS. 2, 3 systems 10 include an actuator controller 16 that typically includes a program that converts a standard voltage signal (such as 0V, 24V, 120V) received from an injection machine controller MC into an instruction signal IS that is compatible with, receivable and interpretable by a motor driver MD to cause the motor driver MD to generate a motor operating control power signal MOCPS that signals the start of an injection cycle and the end of injection cycle, the start typically being a power signal that drives the motor to withdraw the valve pin 1040, 1041, 1042 from a gate closed position and the end being a power signal that drives the motor to drive the valve pin from an upstream position to a gate closed position. The controller 16 can include a program with instructions that can move and drive the valve pin to and along any predetermined position or velocity profile including at reduced velocities as described above. Reduced velocity in the case of the FIG. 2 system means a velocity that is less than the maximum velocity at which the electric actuator is capable of driving the pin, typically less than about 75% of maximum and more typically less than about 50% of maximum velocity whether upstream or downstream.

The actuator controller 16 typically includes additional instructions that can instruct a valve pin 1041, 1042, 1040 to be driven either upstream or downstream starting from either a fully closed downstream or a fully upstream, gate open position at one or more reduced upstream or reduced downstream velocities over at least the beginning portion of the upstream path of travel of the valve pins 1040, 1041, 1042 or the latter portion of the downstream path of travel of the valve pins toward the gates 32, 34, 36 where the tip end 1142 of the pin 1041 restricts flow of the injection fluid through the gate RP, RP2, RP3 such as shown in FIGS. 3A, 3B, 4A, 4B. Reduced upstream velocity (beginning from the closed position) or reduced downstream velocity (typically occurring at the end of the downstream length of the downstream stroke) of a valve pin 1041, FIGS. 3A, 3B, 4A, 4B can serve to lessen the degree of downward flow of injection fluid at the beginning of a cycle or downward force DF, FIGS. 3B, 4B, exerted by the tip end 1142 of the pin on the injection fluid 1153f, FIGS. 3B, 4B, that is forcibly pushed through the gate and into the cavity 1153c, FIGS. 3A, 4A, when the tip end of the valve pin travels downstream to a position where the tip end closes the gate, FIGS. 3A, 4A. Such reduced force DF exerted on the injection fluid 1153g at the very beginning or end portion of travel RP, RP2 of the injection cycle at or near the entrance 34 to the cavity of the mold thus reduces the likelihood of a blemish or artifact being formed on the part that is formed within the cavity at the gate area 34.

Figure 4B:
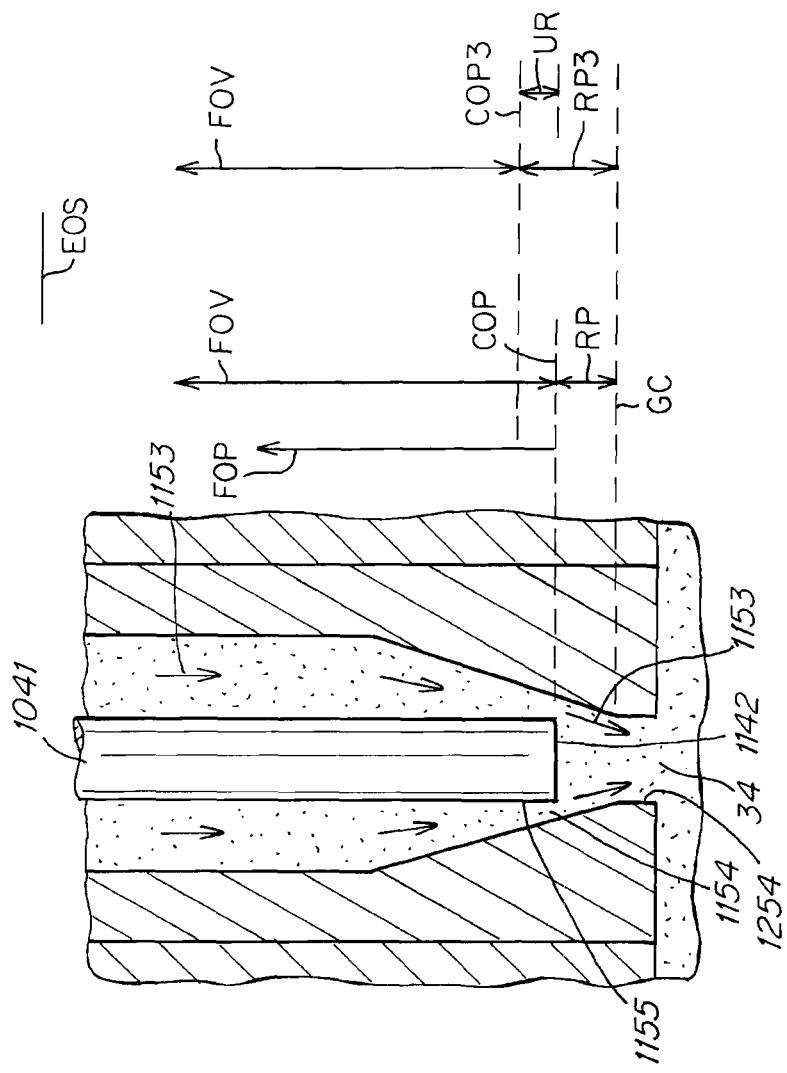
FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the pneumatic pressure of a pneumatic actuator is normally at full pressure and pin velocity is at its maximum.
Figure 4A:
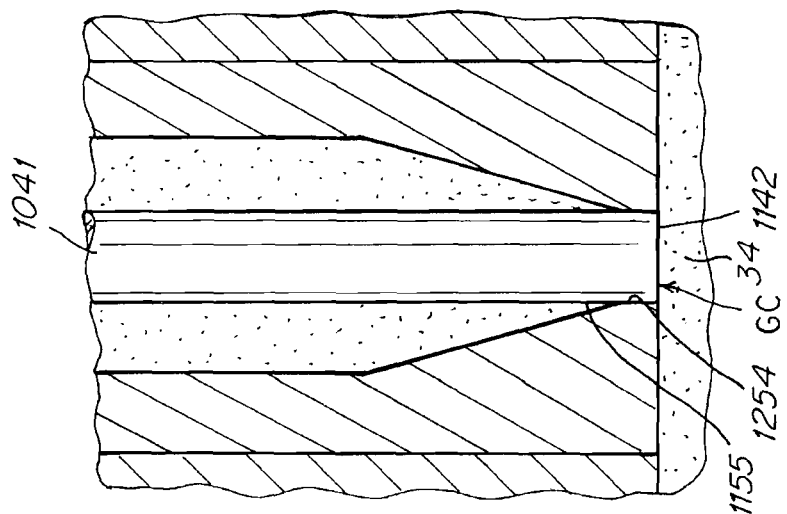

In one embodiment, an electric actuator 940e, 941e, 942e is drivably interconnected to a valve pin 1040, 1041, 1042 in an arrangement wherein the electric motor drives the valve pin along the axis A, FIGS. 3A, 4A, of the valve pin and drives the tip end 1142 of the valve pin between a first position where the tip end of the valve pin obstructs the gate 34 to prevent the injection fluid from flowing into the cavity, a second position upstream of the first position RP, RP2, RP3 wherein the tip end 1142 of the valve pin restricts flow 1153 of the injection fluid along at least a portion of the length of the drive path extending between the first position and the second position, and a third maximum upstream position FOP where the injection fluid material flows freely without restriction from the tip end 1142 of the pin through the first gate.

The electric motor 62 can be configured and arranged relative to the valve pin 1041 such that the driven rotor 154, 174 and shaft 158, 162 components of the motor 62, FIG. 7A are axially aligned with the axis A of the valve pin. Alternatively, a motor 62 configuration can be used such as in U.S. Pat. No. 9,492,960 where the driven rotor and shaft 61 components are arranged at an angle to the axis A, FIGS. 3A, 4A.

In an embodiment such as shown in FIGS. 2, 3 an injection cycle can be started by first opening the pin 1040 of the center nozzle 22, FIG. 1A, and allowing the fluid material 100 (typically polymer or plastic material) to flow up to a position the cavity just before 100b the distally disposed entrance into the cavity 34, 36 of the gates of the lateral nozzles 24, 20. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042. As described below, the rate of upstream withdrawal or travel velocity of lateral pins 1041, 1042 is controlled as described below.

In alternative embodiments, the center gate 32 and associated actuator 940e, 940p and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material NM is allowed to first enter the mold cavity into the stream 102*p* that has been injected from center nozzle 22 past gates 34, 36, the two streams NM and 102*p* mix with each other. If the velocity of the fluid material NM is too high, such as often occurs when the flow velocity of injection fluid material through gates 34, 36 is at maximum, a visible line or defect in the mixing of the two streams 102*p* and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102*p*, the appearance of a visible line or defect in the final molded product can be reduced or eliminated.

Figure 2B:
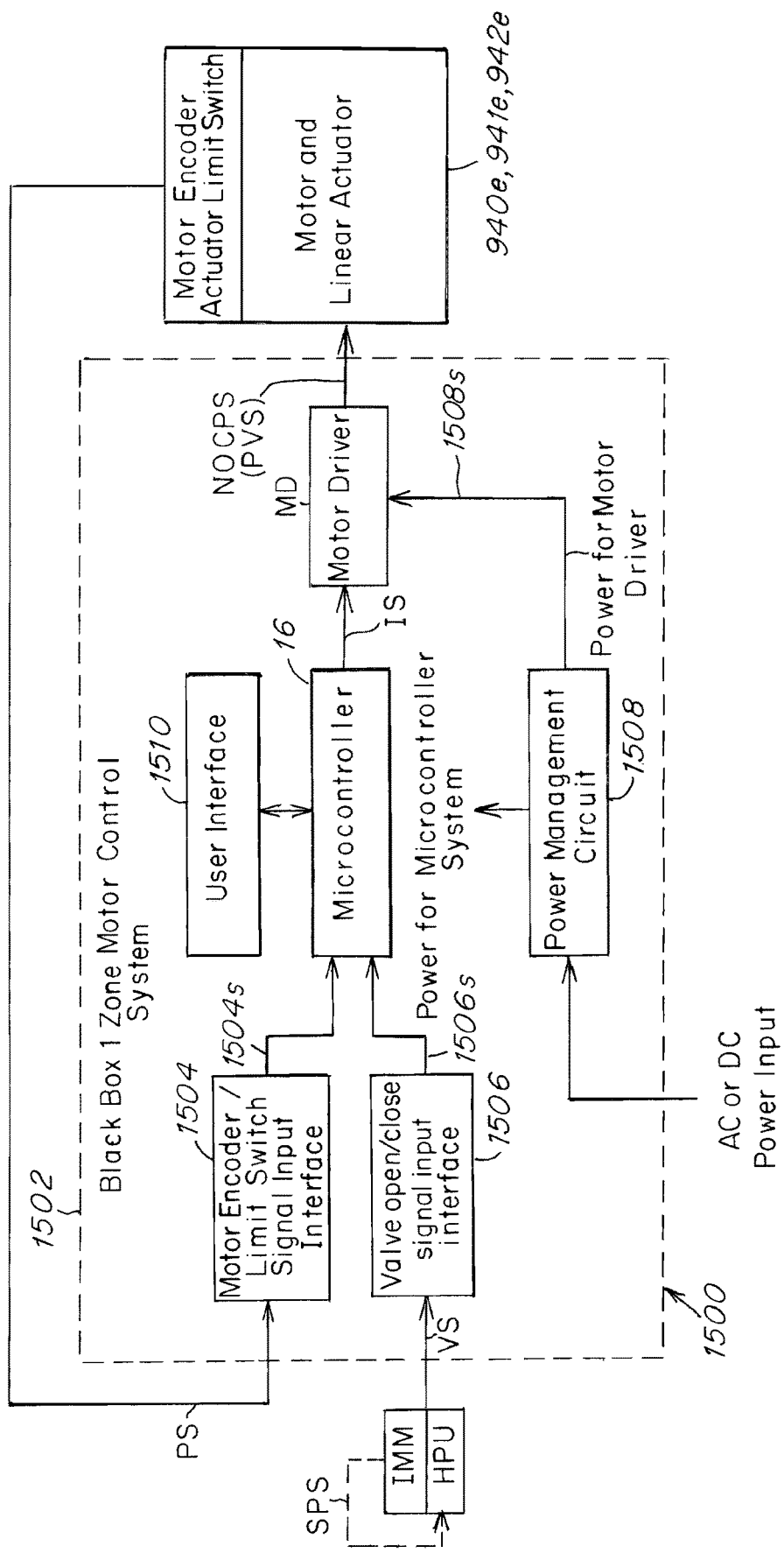
FIG. 2B is a schematic diagram of an arrangement of signal communications between an injection molding machine controller, position sensors, a signal converter and electric actuators.
Figure 2C:
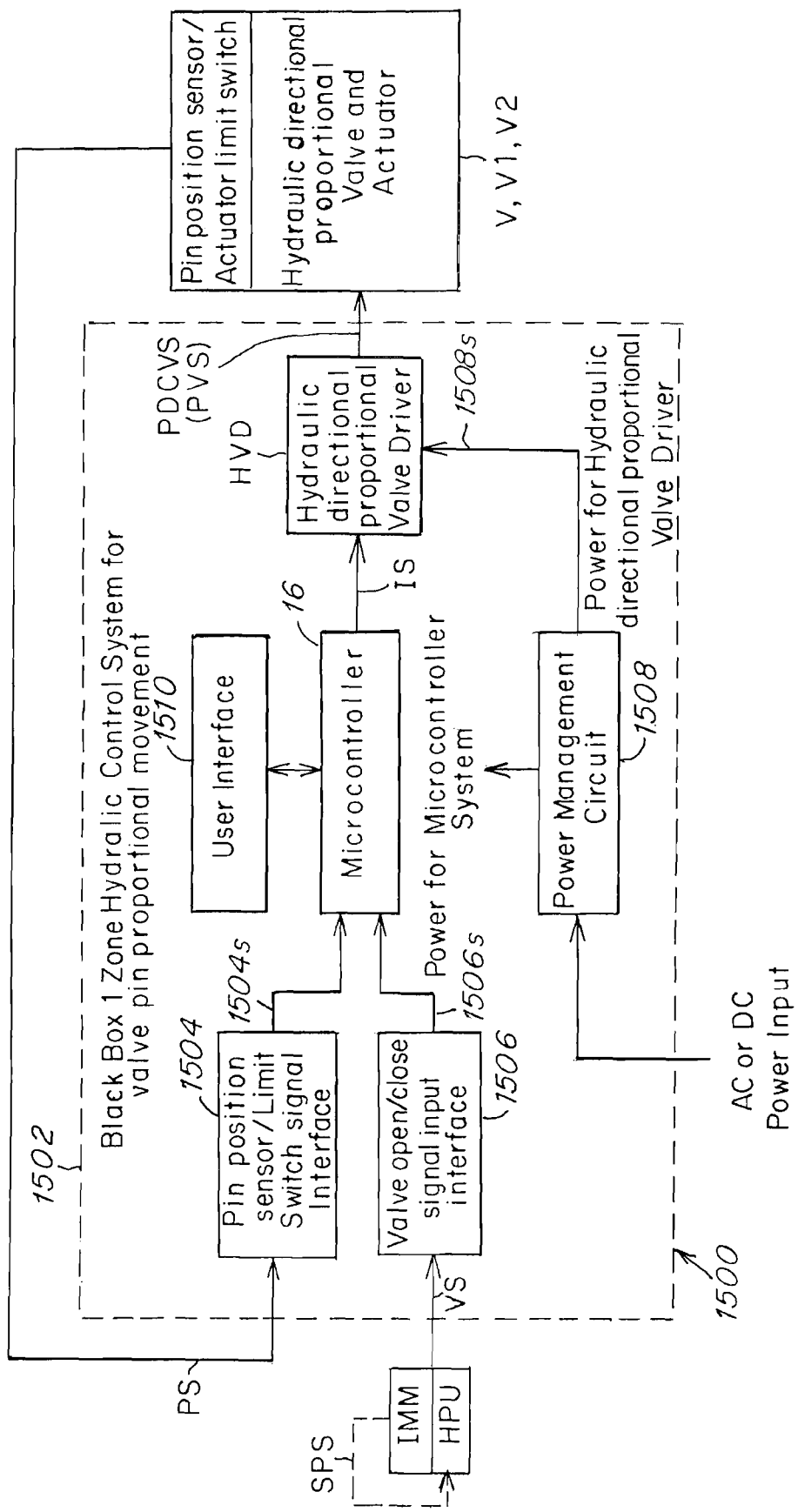
FIG. 2C is a schematic diagram of an arrangement of signal communications between an injection molding machine controller, position sensors, a signal converter and the interfaces of proportional directional hydraulic control valves.
Figure 2D:
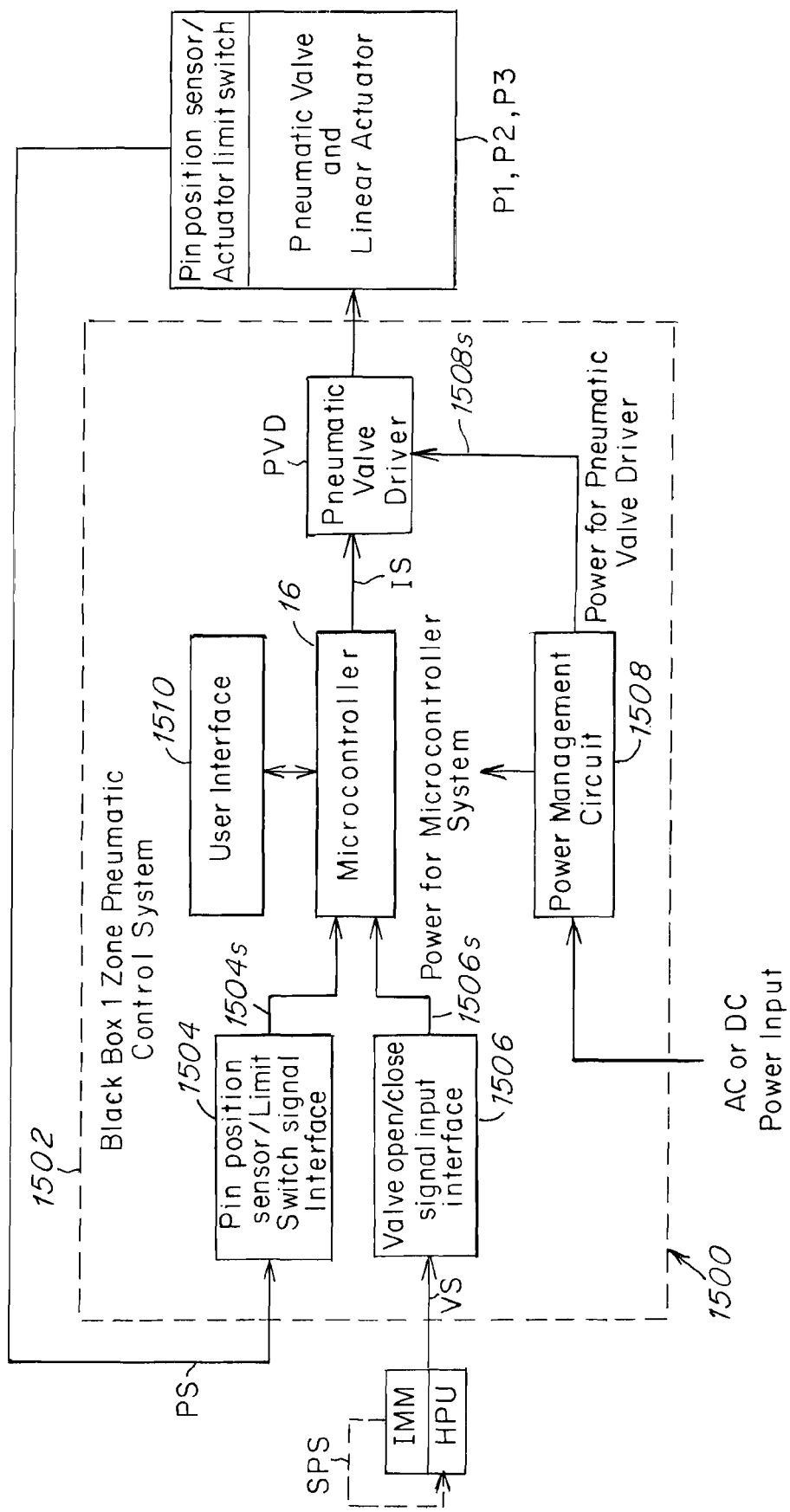
FIG. 2D is a schematic diagram of an arrangement of signal communications between an injection molding machine controller, position sensors, a signal converter and the interfaces of proportional directional pneumatic control valves.

A signal converter 1500, FIGS. 2, 3 is provided that enables a user to connect the standardized voltage signal output (VS, VSC) of a conventional IMM controller to the input of the electric motors 940*e*, 941*e*, 942*e*, FIGS. 2, 3 in the same manner that the user interconnected an IMM controller in a conventional system as in FIG. 1 to DCVs. The signal converter 1500 of the FIGS. 2, 3 systems receives and converts received IMM voltage signals (such as 0 volts, 24 volts, 120 volts) to control signals (MOCPS or PDCVS that operate to begin cycle and end cycle). As shown in FIGS. 2, 2A, 3 the standardized voltage signals VS can be alternatively generated by an HPU (hydraulic power unit) that is physically separate but interconnected to the machine controller MC, the HPU unit, FIGS. 2, 2A, 2B, 2C, 3 receiving a barrel screw position signal SPS from the machine controller and generating therefrom a corresponding standardized VS signal that is in turn sent to the controller 16 for conversion to an instruction signal IS usable by either a motor driver MD, FIG. 2A, or by a proportional directional valve driver HVD, PVD, FIGS. 2B, 2C to drive either a motor or a proportional directional valve to initiate and end an injection cycle.

Thus the standard start and stop control signals generated by an IMM (VS, VSC) can operate in conjunction with the converter 1500 to instruct either the electric actuators, 940*e*, 941*e*, 942*e* or the fluid driven actuators 940*p*, 941*p*, 942*p*, to at least initiate or begin an injection cycle (such as by instructing the actuators 940*e*, 941*e*, 942*e*, 940*p*, 941*p*, 942*p* to drive a valve pin upstream from a gate closed position) and to end or stop an injection cycle (such as by instructing the actuators 940*e*, 941*e*, 942*e*, 940*p*, 941*p*, 942*p* to drive a valve pin downstream from a gate open position into a gate closed position).

Most preferably the physical or mechanical electric signal connectors that are typically used to connect a wire or cable from the IMM (or machine controller MC) to the signal conversion device 1500, are the same physical or mechanical connectors that are used in conventional systems to connect the IMM (or machine controller MC) to the DCVs of a conventional system as described with reference to FIG. 1.

As shown in FIGS. 2, 2A, 2B, 2C the signal output VS of the IMM can be connected directly to signal converter 1500 which converts the VS signal into a motor open close power signal MOPCS or a proportional directional control valve signal PDCVS that is compatible with and processable by the motors 940*e*, 941*e*, 942*e* or the proportional directional control valves V, V1, V2. Alternatively, the signal output of the IMM of the machine controller MC of the FIG. 2 embodiment can comprise a barrel screw position signal SPS that is sent to an intermediate HPU unit by a screw position sensor SPSR.

The MOCPS and PDCVS signals include signals that correspond to the VS signals that operate to affect the beginning and end of an injection cycle.

Typically the FIG. 2 system 10 includes one or more position sensors, 950, 951, 952 or other sensors, SN, SC that detect a selected condition of the injection fluid 18 in one or more of the manifold fluid flow channel 19, a nozzle flow channel 42, 44, 46 or in the cavity 30 of the mold 33.

The actuator controller 16 can include a program that receives and processes a real time signal indicative of a condition of the injection fluid 18 or a component of the apparatus (10) such as rotational position of a rotor 940*r*, 941*r*, 942*r* or axial linear position of a valve pin 1040, 1041, 1042. The real time signals sent to and received by the actuator controller 16 are generated by one or more of position sensors 950, 951, 952 or fluid condition sensors SN, SC. The sensors detect and send a signal to the actuator controller that is typically indicative of one or more of rotational position (sensors 950, 951, 952) of a rotor 940*r*, 941*r*, 942*r* or of linear axial position of a valve pin 1040, 1041, 1042. The fluid condition sensors typically comprise one or more of a pressure or temperature sensor SN that senses injection fluid 18 within a manifold channel 19 or a nozzle channel 42, 44, 46 or senses pressure or temperature of the injection fluid SC within the cavity 30 of the mold 33.

The actuator controller 16 can include a program that processes the received signal(s) from one or more of the sensors 950, 951, 952, SN, SC according to a set of instructions that use the received signals as a variable input or other basis for controlling one or more of the position or velocity of the actuators 940*e*, 941*e*, 942*e* or their associated valve pins 1040, 1041, 1042 throughout all or selected portion of the duration of an injection cycle or all or a portion of the length of the upstream or downstream stroke of the actuators 940*e*, 941*e*, 942*e*.

As shown the controller 16 can be included within and comprise a component of the converter 1500, FIGS. 2, 2A, 2B, 2C, 3. Where the converter 1500 includes a controller 16 that includes position and velocity control instructions, the converter 1500 can thus send its machine open close power signals MOCPS (or valve open close signals PDCVS) together with position velocity signals (PVS) to either the electric actuators 940*e*, 941*e*, 942*e* or proportional directional control valves V, V1, V2. The control signals MOCPS and PDCVS thus include a signal that has been converted from and corresponds to one or the other of the converted VS signals received by the converter 1500 from the IMM controller MC or the HPU. The position or velocity control signals PVS can control the position or velocity of the valve pin according to any predetermined profile of pin position or velocity versus time of injection cycle. The form, format, intensity and frequency of the MOCPS, PDCVS and PVS signals are compatible with the signal receiving interface of the electric actuators 940*e*, 941*e*, 942*e* or valves V, V1, V2.

In an alternative embodiment as shown in FIG. 3, the system 10 utilizes "proportional" directional control valves, V, V1, V2 that can control the movement of the fluid driven actuators 940*p*, 941*p*, 942*p* throughout the entire injection cycle according to a profile of positions or velocities. Proportional directional control valves can be operated to effect positioning of the actuators to both the start of cycle and end of cycle positions of the actuators 940*p*, 941*p*, 942*p* and also to control the rate and position of travel of the actuators over the entire course of an injection cycle and over the entire path of travel of the actuators 940*p*, 941*p*, 942*p* and their associated valve pins 1040, 1041, 1042 through the entire length of the upstream and downstream stroke(s) of the actuators. The system 10 of the FIG. 3 embodiment uses a signal converter 1500 in a manner similar to the use of the converter 1500 in the FIG. 2 electric actuator 940*e*, 941*e*, 942*e* embodiment. Thus, in the FIG. 3 embodiment, the IMM controller MC either sends a conventional standardized VS signal to the signal converter 1500 (or to an HPU) which in turn sends a proportional directional control valve signal PDCVS to the signal receiving interface or driver HVD, FIG. 2C, of a proportional directional control valve V, V1, V2 to effect start of cycle and end of cycle movement of the actuators 940*p*, 941*p*, 942*p*.

More typically in an embodiment as shown in FIG. 3 that uses proportional directional control valves V, V1, V2, the system 10 includes one or more sensors, SN, SC that detect a selected condition of the injection fluid 18 in one or more of a manifold fluid flow channel 19, a nozzle flow channel 42, 44, 46 or in the cavity 30 of the mold 33. The IMM controller MC of the FIG. 3 system can be adapted to send a screw position signal SPS to the intermediate HPU which in turn sends a standardized VS signal to signal converter 1500. As in the FIG. 2 embodiment, the signal converter 1500 of FIG. 3 typically includes an actuator controller 16 that receives and processes a real time signal from one or more of sensors 950, 951, 952, SN, SC, the sensors detecting and sending a signal to the actuator controller 16 that is indicative of one or more of position of a piston or shaft of an actuator 940*p*, 941*p*, 942*p*, or a valve pin 1040, 1041, 1042, pressure or temperature (sensors SN) of the injection fluid 18 within a manifold channel 19 or nozzle channel 42, 44, 46 or pressure or temperature (sensor SC) of the injection fluid within the cavity 30 of the mold 33. The actuator controller 16 preferably includes a program that processes the received signal(s) from one or more of the sensors 950, 951, 952, SN, SC according to a set of instructions that use the received signals as a variable input or other basis for controlling one or more of the position or velocity of the actuators 940*p*, 941*p*, 942*p* or their associated valve pins 1040, 1041, 1042 throughout all or selected portion of the duration of an injection cycle or all or a portion of the length of the upstream or downstream stroke of the actuators 940*p*, 941*p*, 942*p*. As shown, the controller 16 sends its instruction signals IS to the signal receiving interface or driver HVD, FIG. 2C, of a proportional directional control valve V, V1, V2 which in turn sends the valve control signal PDCVS to the valves V, V1, V2. The control signal PDCVS includes a signal that has been converted from and corresponds to the standardized VS signals received by the converter 1500 from the IMM controller MC or HPU. The control signal PDCVS further includes position or velocity control signals generated by the program and instructions contained within the actuator controller 16. The form, format, intensity and frequency of the PDCVS signal is compatible with the signal receiving interface of the proportional directional control valves V, V1, V2.

Preferably, the valve pin 1040, 1041, 1042 and their associated gates are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP.

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), where the pin is no longer restricting flow of injection mold material through the gate. In such an embodiment, at the expiration of the predetermined amount of time when the pin tip 1142 reaches the FOP (full open) position, the pin 1041 can be immediately driven by the actuator system at maximum velocity FOV (full open velocity) typically such that the restriction valve 600 is opened to full 100% open.

In embodiments, where the tip 1142 has reached the end of restricted flow path RP2 and the tip 1142 is not necessarily in a position where the fluid flow 1153 is not still being restricted, the fluid flow 1153 can still be restricted to less than maximum flow when the pin has reached the changeover position COP2 where the pin 1041 is driven at a higher, typically maximum, upstream velocity FOV. In the examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. In this embodiment, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at a less than maximum velocity throughout the entirety of the travel path of the pin during an injection cycle from the gate closed position GC up to the end-of-stroke EOS position, the actuator controller 16 being programmed to instruct the drive system for the actuator to be driven at one reduced velocity for an initial path length or period of time and at another less than maximum velocity subsequent to the initial reduced velocity path or period of time for the remainder of the injection cycle whereby the actuator/valve pin travels at a less than maximum velocity for an entire closed GC to fully open EOS cycle.

In a typical example FOV is 100 mm/sec. Typically, when the time period or path length for driving the pin 1041 at reduced velocity has expired or been reached and the pin tip 1142 has reached the position COP, COP2, the restriction valve 600 is opened to full 100% open velocity FOV position such that the pins 1041, 1042 are driven at the maximum velocity or rate of travel that the pneumatic system is capable of driving the actuators 941, 942. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

The invention includes configurations where a valve pin 1040, 1041, 1042 is driven downstream starting from a fully upstream, gate open position at one or more reduced downstream velocities over at least the latter portion of the downstream path of travel of the pin toward the gate where the tip end 1142 of the pin 1041 restricts flow of the injection fluid through the gate RP, RP2, RP3 such as shown in FIGS. 3A and 4A. Reduced downstream velocity drive of a valve pin 1041, FIGS. 3A, 3B, 4A, 4B can serve to lessen the degree of downward force DF, FIGS. 3B, 4B, exerted by the tip end 1142 of the pin on the injection fluid 1153f, FIGS. 3B, 4B, that is forcibly pushed through the gate and into the cavity 1153c, FIGS. 3A, 4A, when the tip end of the valve pin travels downstream to a position where the tip end closes the gate, FIGS. 3A, 4A. Such reduced force DF exerted on the injection fluid 1153g at the very end portion of travel RP, RP2 of the injection cycle at the entrance 34 to the cavity of the mold thus reduces the likelihood of a blemish or artifact being formed on the part that is formed within the cavity at the gate area 34.

In one embodiment of a method according the invention, an actuator 940e, 940f, 940p, 941e, 941f, 941p, 942e, 942f is drivably interconnected to a valve pin 1040, 1041, 1042 in an arrangement wherein the actuator drives the valve pin along the axis A, FIGS. 3A, 4A, of the valve pin and drives the tip end 1142 of the valve pin between a first position where the tip end of the valve pin obstructs the gate 34 to prevent the injection fluid from flowing into the cavity, a second position upstream of the first position RP, RP2, RP3 wherein the tip end 1142 of the valve pin restricts flow 1153 of the injection fluid along at least a portion of the length of the drive path extending between the first position and the second position, and a third maximum upstream position FOP where the injection fluid material flows freely without restriction from the tip end 1142 of the pin through the first gate.

Where the actuator comprises an electric actuator, the actuator 940e, 941e, 942e can be configured and arranged relative to the valve pin 1041 such that the driven rotor and shaft components of the motor, are axially aligned with the axis A of the valve pin. Alternatively, a motor 62 configuration can be used such as in U.S. Pat. No. 9,498,909 where the driven rotor and shaft components are arranged at an angle to the axis A, FIGS. 3A, 4A or the axis of the valve pin 1041 component.

The actuators are operable to drive the valve pin at one or more intermediate rates of upstream and downstream travel extending between zero and a maximum rate of upstream travel and a maximum rate of downstream travel, the method comprising selecting a length of travel between a maximum upstream position and a predetermined third position that is downstream of the maximum upstream position and upstream of the first downstream position, and controllably operating the actuator to drive the associated valve pin at one or more high rates of downstream travel that are equal to or less than the maximum rate of downstream travel when the valve pin is disposed at the maximum upstream position during the course of an injection cycle, sensing the position of the valve pin to determine when the tip end of the valve pin has reached the preselected downstream position during the course of downstream travel, and controllably operating the actuator to drive the valve pin at one or more intermediate rates of downstream travel that are less than the one or more high rates of downstream travel when the tip end of the valve pin has been determined in the step of sensing to have reached the downstream position to drive the tip end of the valve pin continuously downstream from the downstream position to a closed position.

Figure 5A:
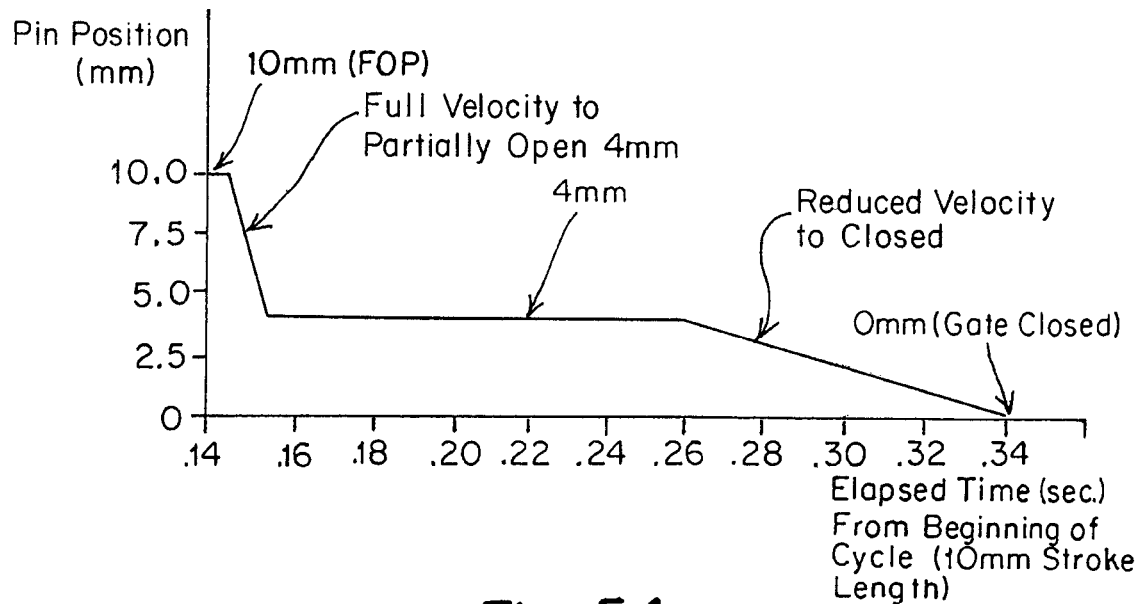
FIGS. 5A-5B show examples of downstream and upstream drive pin position protocols.
Figure 5B:
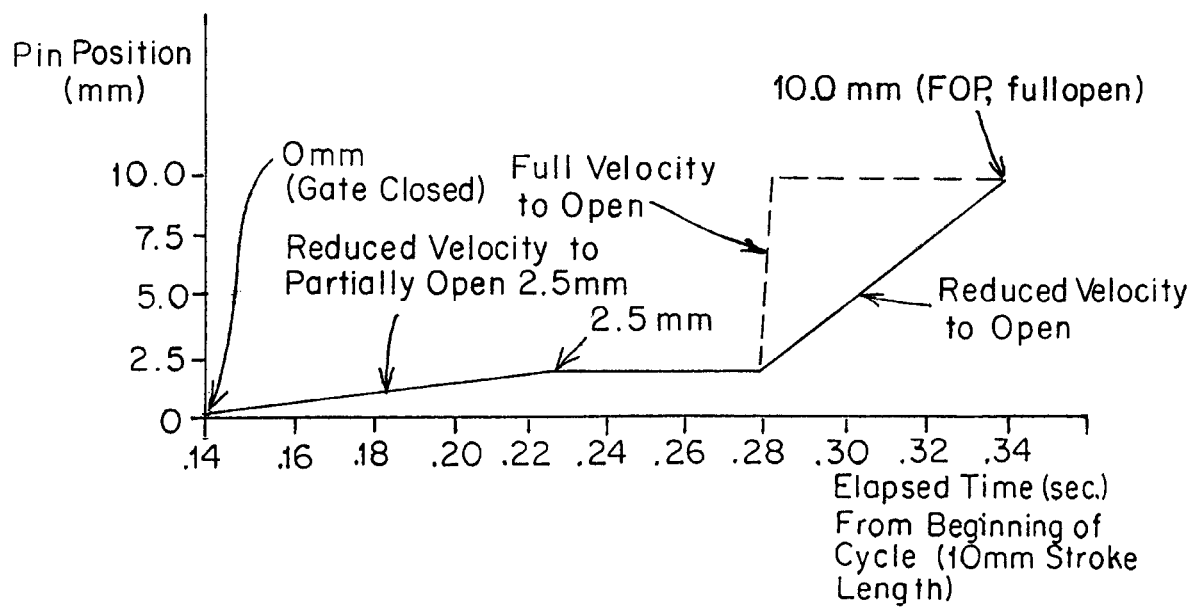

In an alternative pin movement protocol, an example of which is shown in FIGS. 5A, 5B the tip end of the pin 1040, 1041, 1042 is driven either continuously upstream or continuously downstream with the tip end of the pin being held or maintained in a reduced or restricted flow position intermediate the full open and gate closed positions for some selected period of time during the course of travel between full open and gate closed, typically at a restricted flow "pack" or "pack pressure" position after the cavity 30 has been substantially already filled with injection fluid 18 typically after the injection fluid 18 has filled 90% or more of the volume of the cavity. In the FIG. 5A example the pin is held in an intermediate reduced or restricted flow 4 mm upstream from gate closed position for between about 0.15 and about 0.26 seconds. Preferably, the actuator controller 16 instructs the valve pin 1041, 1042, 1040 to travel either (a) continuously upstream during the upstream travel portion of the cycle rather than follow a drive fluid pressure, pin position or injection fluid pressure profile where the pin might travel in a downstream direction during the course of the upstream travel portion of the injection cycle, or (b) continuously downstream during the downstream travel portion of the cycle rather than follow a profile where the pin travels upstream during the course of the downstream travel portion of the injection cycle.

What is claimed is:

1. An injection molding apparatus (10) comprising an injection molding machine (IMM) having a drivably rotatable barrel screw (BS) that generates an injection fluid (18), a heated manifold (40) that receives the injection fluid (18) from the injection molding machine (IMM) and distributes the injection fluid (18) to one or more gates (32, 34, 36), a mold (42) having a cavity (30) communicating with the gates to receive the injection fluid (18), the injection molding machine (IMM) including a machine controller (MC) or control unit (HPU) that generates one or more direction control valve compatible signals (VPS), wherein the directional control valve compatible signals (VS) are compatible for receipt and use by a signal receptor, interface or driver of a standard directional control valve (12) to instruct the fluid directional control valve (12) to move to a position that routes a source of drive fluid to flow in a direction that drives an interconnected fluid drivable actuator (940f, 941f, 942f) to move in a direction that operates to begin an injection cycle and to end an injection cycle, a signal converter (1500) interconnected to the machine controller (MC) or control unit (HPU), the signal converter (1500) being adapted to convert the directional control valve compatible signals (VPS) to a command signal (MOPCS, PDCVS) that is compatible with a signal receptor or interface of an electrically powered actuator (940e, 941e, 942e) or a signal receptor or interface of a proportional directional control valve (V, V1, V2) that is interconnected to a fluid driven actuator (940p, 941p, 942p), wherein the command signals (MOPCS, PDCVS) are converted by the signal converter (1500) into a form, frequency, power or format that is usable by the signal receptor or interface of the electrically powered actuator (940e, 941e, 942e) or the proportional directional control valve (V, V1, V2) to respectively cause the electrically powered actuator (940e, 941e, 942e) or the proportional directional control valve (V, V1, V2) to be driven in a direction that operates to either begin an injection cycle or to end an injection cycle.

2. The apparatus according to claim 1 wherein the direction that operates to begin an injection cycle is a direction that operates to cause the actuator (940e, 941e, 942e, 940p, 941p, 942p) or its associated valve pin (1040, 1041, 1042) to open a gate (32, 34, 36) and the direction that operates to end an injection cycle is a direction that causes the actuator (940e, 941e, 942e, 940p, 941p, 942p) or its associated valve pin (1040, 1041, 1042) to close the gate (32, 34, 36).

3. The apparatus according to claim 1 wherein the direction that operates to begin an injection cycle is an upstream direction in which the actuator (940e, 941e, 942e, 940p, 941p, 942p) or its associated valve pin (1040, 1041, 1042) moves upstream from a gate closed position to an open gate position (32, 34, 36) and the direction that operates to end an injection cycle is a downstream direction in which the actuator (940e, 941e, 942e, 940p, 941p, 942p) or its associated valve pin (1040, 1041, 1042) moves downstream from an open gate position to a closed gate position (32, 34, 36).

4. The apparatus according to claim 1 wherein the directional control valve compatible signals (VPS) comprises a voltage signal of predetermined voltage or magnitude indicative of a predetermined rotational position of the barrel screw (BS) of the injection molding machine (IMM) that generates pressurized injection fluid (18) within the apparatus.

5. The apparatus according to claim 1 wherein the apparatus (10) further comprises one or more sensors (950, 951, 952, SN, SC, SPSR, BPSR) that detect and generate one or more sensor signals indicative of one or more of rotational or linear position of an actuator (940e, 941e, 942e, 940p, 941p, 942p) or its associated valve pin (1040, 1041, 1042), pressure or temperature of the injection fluid 18 within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (940e, 941e, 942e, 940p, 941p, 942p) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940e, 941e, 942e, 940p, 941p, 942p) or its associated valve pin (1040, 1041, 1042) such that the valve pin is withdrawn from a closed gate position upstream at a reduced velocity over a selected path of upstream travel, or that, instructs the actuator (940e, 941e, 942e, 940p, 941p, 942p) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940e, 941e, 942e, 940p, 941p, 942p) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

6. A method of beginning and ending an injection cycle comprising operating an apparatus (10) in accordance to claim 1 to perform an injection cycle.

7. A signal converter (1500) for converting signals generated by an injection molding apparatus (10) that is comprised of an injection molding machine (IMM) having a drivably rotatable barrel screw (BS) that generates an injection fluid (18), a heated manifold (40) that receives an injection fluid (18) from the injection molding machine (IMM) and distributes the injection fluid (18) to one or more gates (32, 34, 36), a mold (42) having a cavity (30) communicating with the gates to receive the injection fluid (18), wherein the injection molding machine (IMM) includes a machine controller (MC) or a control unit (HPU) that generates one or more directional control valve compatible signals (VPS), wherein the direction control valve compatible signals (VPS) are compatible for use by a signal receptor, interface or driver of a standard fluid directional control valve (12) to instruct the fluid directional control valve (12) to move to a position that routes a source of drive fluid to flow in a direction that drives an interconnected fluid drivable actuator (940f, 941f, 942f) to move in a direction that operates to begin an injection cycle and to move in a direction that operates to end an injection cycle, wherein the signal converter (1500) is interconnected to the machine controller (MC) or control unit (HPU), the signal converter (1500) receiving and converting the directional control valve compatible signals (VPS) to a command signal (MOPCS, PDCVS) that is compatible with a signal receptor or interface of an electrically powered actuator (940e, 941e, 942e) or a signal receptor or interface of a proportional directional control valve (V, V1, V2) that drives a fluid driven actuator (940p, 941p, 942p), wherein the signal converter (1500) includes a processor that converts the command signals (MOPCS, PDCVS) into a form, frequency, power or format that is usable by the signal receptor or interface of the electrically powered actuator (940e, 941e, 942e) or by the signal receptor or interface of the proportional directional control valve (V, V1, V2) to respectively cause the electrically powered actuator (940e, 941e, 942e) or the proportional directional control valve (V, V1, V2) to be driven in a direction that operates to either begin an injection cycle or to end an injection cycle.

8. The signal converter according to claim 7 wherein the direction that operates to begin an injection cycle is a direction that operates to moves the actuator (940e, 941e, 942e, 940p, 941p, 942p) or its associated valve pin (1040, 1041, 1042) to open a gate (32, 34, 36) and the direction that operates to end an injection cycle is a direction that operates to move the actuator (940e, 941e, 942e, 940p, 941p, 942p) or its associated valve pin (1040, 1041, 1042) to close the gate (32, 34, 36).

9. The signal converter according to claim 7 wherein the direction that operates to begin an injection cycle is an upstream direction in which the actuator (940e, 941e, 942e, 940p, 941p, 942p) or its associated valve pin (1040, 1041, 1042) moves upstream from a gate closed position to an open gate position (32, 34, 36) and the direction that operates to end an injection cycle is a downstream direction in which the actuator (940e, 941e, 942e, 940p, 941p, 942p) or its associated valve pin (1040, 1041, 1042) moves downstream from an open gate position to a closed gate position (32, 34, 36).

10. The signal converter according to claim 7 wherein the directional control valve compatible signals (VPS) comprise a voltage signal of predetermined voltage or magnitude indicative of a predetermined rotational position of the barrel screw (BS) of the injection molding machine (IMM) that generates pressurized injection fluid (18) within the apparatus.

11. The signal converter according to claim 7 wherein the apparatus (10) further comprises one or more sensors (950, 951, 952, SN, SC, SPSR, BPSR) that detect and generate one or more sensor signals indicative of one or more of rotational or linear position of an actuator (940e, 941e, 942e, 940p, 941p, 942p) or its associated valve pin (1040, 1041, 1042), pressure or temperature of the injection fluid 18 within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (940e, 941e, 942e, 940p, 941p, 942p) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940e, 941e, 942e, 940p, 941p, 942p) or its associated valve pin (1040, 1041, 1042) such that the valve pin is withdrawn from a closed gate position upstream at a reduced velocity over a selected path of upstream travel, or that, instructs the actuator (940e, 941e, 942e, 940p, 941p, 942p) or its associated valve pin (1040, 1041, 1042) to travel such that the valve pin is driven downstream at a reduced velocity over a selected path of travel where a distal tip end of the pin travel from upstream of the gate to a gate closed position, or that, instructs the actuator (940e, 941e, 942e, 940p, 941p, 942p) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

12. A method of beginning and ending an injection cycle comprising operating a signal converter (1500) in accordance with claim 7 to perform an injection cycle.

13. A modular control unit (1500) comprising:

a housing (1502) containing an electronic controller (16), multiple input interfaces (1504, 1506), and at least one driver (MD, HVD, PVD), a first input interface (1506) configured to receive a valve control signal (VS) specifying valve open or valve closed or start of injection cycle and end of injection cycle, and outputting a data signal (1506s) indicative thereof to the controller (16);

a second input interface (1504) configured to receive a pin position signal (PS) specifying a position of a valve pin along a continuous path of travel and outputting a data signal (1504s) indicative thereof to the controller (16);

the controller (16) including a processor and computer readable media with instructions for pre-configured actuated control of valve pin position, wherein the instructions, when executed by the processor, cause the processor to generate, based on the data signals (VS, PS) an output control signal (IS) for controlling valve pin position via at least one of: a) a hydraulic proportional directional control valve (V, V1, V2), b) a pneumatic proportional directional control valve (P1, P2, P3), and c) an electric motor (940e, 941e, 942e), the at least one driver (MD, HVD, PVD) configured to receive the output control signal from the controller and generate a control unit output signal (MOPCS, PDCVS, PVS) that drives at least one of a) the hydraulic proportional directional control valve (V, V1, V2), b) the pneumatic proportional directional control valve (P1, P2, P3), and c) the electric motor (940e, 941e, 942e) for control movement of the valve pin.

14. The modular control unit (1500) of claim 13 wherein the pin position signal (PS) is received from a sensor (950, 951, 952) that senses a linear or rotational position of an actuator (940e, 940f) or a valve pin (1040, 1041).

15. The modular control unit of claim 13 wherein the housing (1502) further contains a power management circuit (1508) that receives an input AC or DC power input, and wherein the power management circuit outputs a power signal (1508s) to the driver (MD, HVD, PVD).

16. The modular control unit of claim 13 adapted for use in an injection molding apparatus wherein:
- an injection molding machine (IMM) or a fluid pressure unit (HPU) generates the input valve control signal (VS.) specifying valve open and valve closed or start of injection cycle and end of injection cycle, and
- a position sensor (950, 951, 952) generates the input pin position signal (PS).

17. The modular control unit of claim 13 further comprising a user interface (1510) for receiving input from a human operator, the input being transmitted to the controller (16) and the input being stored on the computer readable media.

18. The modular control unit of claim 13 wherein the input is executed by the processor, along with the instructions, for generating the output control signal.

19. The modular control unit of claim 13 wherein the output control signal specifies instructions for one or more of: calibrating a valve pin position sensor, specifying a valve pin open or closed position, specifying a valve pin position along the continuous path of travel, and specifying a valve pin velocity.

20. The modular control unit of claim 13 wherein the instructions for pre-configured actuated control of valve pin position comprise sequential valve gating control parameters.

21. The modular control unit of claim 13 wherein:
- the instructions for pre-configured actuated control of valve pin position comprise simultaneous valve gating control parameters.

22. A modular injection molding system control unit (1500) interconnected to an injection molding machine (IMM) controller (MC) comprising:
- a housing (1502) containing an electronic controller (16), one or more input interfaces (1504, 1506), and at least one driver (MD, HVD, PVD),
- at least one input interface (1506) configured to receive a valve control signal (VS) specifying valve open and valve closed or start of injection cycle and end of injection cycle, and outputting a data signal (1506s) indicative thereof to the controller (16);
- the controller (16) including a processor and computer readable media with instructions for pre-configured actuated control of valve pin position, wherein the instructions, when executed by the processor, cause the processor to generate, based on the data signal (1506s) an output control signal (IS) for controlling valve open and valve closed position or start of injection cycle and end of injection cycle via at least one of: a) a hydraulic proportional directional control valve (V, V1, V2), b) a pneumatic proportional directional control valve (P1, P2, P3), and c) an electric motor (940e, 941e, 942e),
- the at least one driver (MD, HVD, PVD) configured to receive the output control signal (IS) from the controller (16) and generate a control unit output signal (MOPCS, PDCVS) that drives at least one of a) the hydraulic proportional directional control valve (V, V1, V2), b) the pneumatic proportional directional control valve (P1, P2, P3), and c) the electric motor (940e, 941e, 942e) for control movement of the valve pin.

23. The system of claim 22 wherein the at least one input interface (1506) receives the valve control signal (VS) either directly from the injection molding machine (IMM) controller (MC) or indirectly from an intermediate control unit (HPU) that receives a corresponding instruction signal (SPS) from the injection molding machine (IMM) that is at least indicative of valve open and valve closed or start of injection cycle and end of injection cycle.

* * * * *